Figure 1:
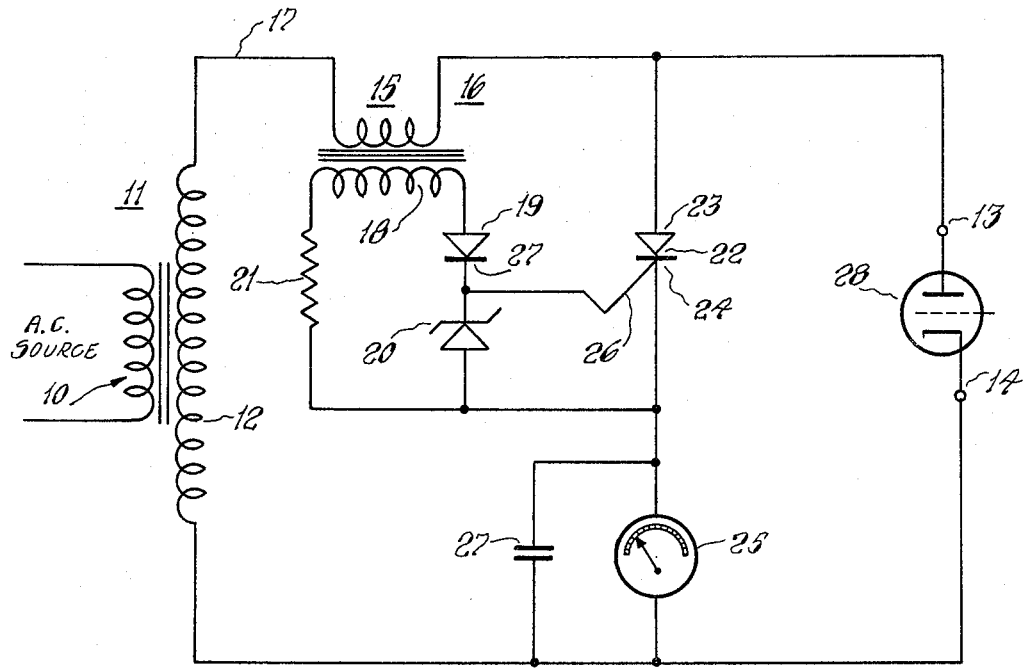

Oct. 11, 1966    R. CASANOVA ET AL    3,278,836
APPARATUS INCLUDING CONTROLLED METER APPLYING MEANS
FOR THE MEASUREMENT OF GAS TUBE VOLTAGE DROP
Filed Dec. 24, 1963

INVENTORS.
EMANUEL ROTHMAN
RALPH CASANOVA
BY Ernest J Weinberger
Max N Farmer
ATTORNEYS

United States Patent Office 3,278,836
Patented Oct. 11, 1966

---

3,278,836
APPARATUS INCLUDING CONTROLLED METER APPLYING MEANS FOR THE MEASUREMENT OF GAS TUBE VOLTAGE DROP
Ralph Casanova and Emanuel Rothman, Brooklyn, N.Y., assignors to the United States of America as represented by the Secretary of the Navy
Filed Dec. 24, 1963, Ser. No. 333,243
9 Claims. (Cl. 324—24)

The invention described herein may be manufactured and used by or for the Government of the United States of America for governmental purposes without the payment of any royalties thereon or therefor.

This invention relates generally to tube checkers and the measurement of tube characteristics and more particularly to the determination of the potential drop across a gas tube independent of the current passing through the tube.

Two methods for ascertaining the voltage drop across a gas tube are presently in use. The first of these which may be referred to as a laboratory technique essentially involves the use of a cathode ray oscilloscope on whose screen the waveform is observed under various conditions. From such observations, a determination of the voltage drop can be made. This method, however, necessitates the use of expensive, bulky, delicate equipment which must be properly calibrated and operation restricted to only trained, skilled personnel. Where general or field use is contemplated the foregoing technique is in applicable.

The second and more widely employed method, commonly known as the Wattmeter method relies on the reading of a wattmeter while knowing and maintaining a constant current. Two variations of the above differ only in the fact that for one the circuit is arranged with suitable shunts so as to provide a constant one ampere through the wattmeter current coil thus furnishing a direct indication of one volt per watt. The obvious drawback here lies in the fact that gas tubes even of the same type vary in their current characteristics and therefore the method necessitates an adjustment of the wattmeter current for each and every tube evaluated. The second variation is one in which both the average power and current are determined and by the proper mathematical computations the average voltage is determined therefrom. In addition to not being direct and requiring experienced operators, this method must nonetheless be capable of measurement of tubes whose current ratings are widely divergent. Present gas tube currents cover the range from approximately 100 milliamperes to 20 amperes and so the use of multi-range meters, a multiplicity of shunts and an additional ammeter is required. Where currents of less than one ampere are encountered, the computation variation is mandatory.

In view of the foregoing inherent limitations, it is an object of this invention to provide a simple, inexpensive, and direct reading apparatus for the measurement of conduction gas tube potential drop, which apparatus may be usable for all presently known gas tubes by an unskilled or untrained operator.

Another object is to provide a gas tube voltage drop measurement apparatus which is versatile, compact, rugged, accurate and does not require either a shunt or an ammeter or any computation in ascertaining the voltage drop.

Other objects and advantages will appear from the following description of an example of the invention, and the novel features will be particularly pointed out in the appended claims.

In the accompanying drawings:
FIG. 1 is a schematic representation of an embodiment made in accordance with the principles of this invention; and
FIG. 2 is a graphic representation of the wave-shapes present in various portions of the embodiment of FIG. 1.

In the embodiment of FIG. 1 a source of alternating current (not shown) is connected across the primary winding 10 of input transformer 11 while the secondary winding 12 thereof is connected across a pair of terminals 13–14 by way of the primary winding 15 of coupling transformer 16 which is in series with one line 17 connecting terminal 13 with the secondary 12. The secondary 18 of the coupling transformer 16 is connected across the series combination of diode 19, Zener diode 20, and a limiting resistor 21. The diode 19 is essentially an asymmetrical or unidirectional conducting device or rectifier, while the Zener diode (also called an avalanche diode) is an electronic solid-state device which utilizes certain features of the electrical characteristics of a rectifying junction and effectively stabilizes the voltage thereacross.

A silicon controlled rectifier (SCR) 22 having its anode 23 and cathode 24 in series with a voltage determining means 25 such as a voltmeter or comparator is electrically connected across the terminals 13–14. The SCR is effectively an asymmetrically conducting rectifier having a gate or control element 26 much the same as a thyratron and exhibits similar characteristics. The control element 26 is tied to the junction between the cathode 27 of diode 19 and the Zener diode 20. A capacitor 28 provides the functional waveform damping at the voltage determining means 25 in order to prevent and eliminate the introduction of such waveforms from appearing at the means 25.

Figure 2:
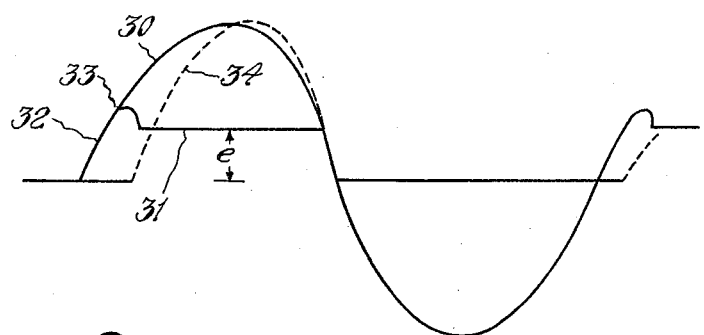

Summarizing the overall operation and with reference to FIG. 2, it is clear that for a typical source of alternating current the voltage waveform at the input transformer 11 may be represented as curve 30 and such would also appear across terminals 13–14. When, however, the gas tube 28 to be evaluated, is interposed between the terminals as illustrated with the anode at 13 and the cathode at 14, the voltage waveform 31 appears across 13–14. The voltage across the tube builds up as along 32 and when it is of a sufficient potential to cause ionization as at 33 the tube starts conducting and the current therethrough follows generally the curve 34, while the voltage drops to the level $e$ which is the necessary potential for sustained conduction. When the source polarity is reversed the tube ceases to conduct, but the voltage follows the negative half cycle of the source voltage. During this cycle as the gas tube commences to conduct, a coupling voltage is generated at the secondary of transformer 16 due to the current flow in the primary. The current induced in the series loop comprising secondary 18, diode 19, Zener diode 20 and limiting resistor 21, which current is unidirectional, generates a voltage across the Zener diode that is coupled to the SCR control element 26 causing it to conduct and to effectively place the measuring means 25 across the gas tube. Clearly the only time that a voltage exists at the Zener diode gating the SCR "on," is when the gas tube is conducting. Therefore the measuring means indicates the average potential $e$, or the voltage, only for tube conduction. The SCR is turned off or reversed biased directly by the source voltage so that the input to the measuring means is deactivated in phase and synchronization is unnecessary.

Gas tube conduction current flowing through the coupling transformer induces a current in the secondary thereof. This induced current effectively gates the SCR permitting the measuring means to read the voltage between the terminals 13–14. The flow of magnetic decay current is eliminated by diode 19 while the Zener diode prevents excessive voltage from appearing at and damaging the gate junction of the SCR and causes the excess voltage to appear across the limiting resistor. Capacitor 27, on the other hand, damps the interrupted direct-current voltage at the measuring means 25.

This invention provides a simple, compact, inexpensive and reliable apparatus for the measurement of voltage drop in gas tubes. No adjustment is necessary to read accurate voltage drops even with a very wide variation in anode current, the determination of which current it is not necessary. This apparatus may simply be inserted into existing equipment without any significant changes requiring only one point of insertion and one connection.

It will be understood that various changes in the details, materials and arrangements of parts (and steps), which have been herein described and illustrated in order to explain the nature of the invention, may be made by those skilled in the art within the principle and scope of the invention as expressed in the appended claims.

We claim:
1. An apparatus for the dynamic measurement of the potential drop across a gas tube while in the conduction state which comprises:
   (a) a source of alternating current connected across the anode-cathode of said gas tube,
   (b) a first asymmetrically conducting device having an anode, a cathode and a control element,
   (c) a voltage measuring means in series combination with said anode and cathode of said asymmetrically conducting device, said series combination connected across said source,
   (d) an induction means coupled to said source having output terminals and an output voltage proportional to the current passing through said gas tube,
   (e) a second asymmetrical device having an anode and a cathode,
   (f) a series loop having connected therein said second device and said output terminals, and
   (g) conductor means connecting said control element and said cathode of said second device,
   (h) whereby said voltage measuring device will indicate the average potential drop across the said gas tube.

2. The apparatus according to claim 1, wherein said first device is a thyratron tube.

3. The apparatus according to claim 1, wherein said first device is a silicon controlled rectifier.

4. The apparatus according to claim 2, wherein said induction means is a transformer having a primary and a secondary winding, one of said windings in circuit between said source and said gas tube and the other winding in said series loop.

5. The apparatus according to claim 4, further including a Zener diode connected in said series loop.

6. The apparatus according to claim 5, further including a resistance connected in said series loop.

7. The apparatus according to claim 6, further including a capacitor connected across said voltage measuring means.

8. A measuring apparatus for determining the dynamic potential drop across a gas tube having an anode and cathode, while the tube is operating, which comprises:
   (a) a source of alternating current,
   (b) an input transformer having a primary and a secondary winding with its primary winding connected to said source,
   (c) a coupling transformer having a primary and a secondary winding,
   (d) a first series loop circuit having connected therein said secondary winding of said input transformer, said primary of said coupling transformer and said anode-cathode of said gas tube,
   (e) a diode,
   (f) a Zener diode,
   (g) a limiting resistor,
   (h) a second series loop having connected therein said secondary of said coupling transformer, said diode, said Zener diode and said resistor,
   (i) a silicon controlled rectifier having an anode, a cathode and a control element,
   (j) a voltage measuring means,
   (k) said cathode-anode of said rectifier and said measuring means series-connected across said anode-cathode of said gas tube, and
   (l) a third series loop including therein said control element, said Zener diode and said cathode of said rectifier,
   (m) whereby said measuring means will indicate the average dynamic potential drop across said gas tube.

9. A voltage measuring device which comprises:
   (a) a source of alternating current,
   (b) an input transformer having a primary and a secondary winding with its primary winding connected to said source,
   (c) a coupling transformer having a primary and a secondary winding,
   (d) a pair of terminals,
   (e) a first series loop circuit having connected therein said secondary winding of said input transformer, said primary of said coupling transformer and said terminals,
   (g) a Zener diode
   (h) a limiting resistor,
   (i) a second series loop having connected therein said secondary of said coupling transformer, said diode, said Zener diode and said resistor,
   (j) a silicon controlled rectifier having an anode, a cathode and a control element,
   (k) a voltage measuring means,
   (l) said cathode-anode of said rectifier and said measuring means series connected across said terminals, and
   (m) a third series loop including therein said control element, said Zener diode and said cathode of said rectifier,
   (n) whereby when a gas tube under test is connected across said terminals, said measuring means will indicate the average dynamic potential drop across the tube.

No references cited.

WALTER L. CARLSON, *Primary Examiner.*
EDWARD L. STOLARUN, *Assistant Examiner.*